June 1, 1965   W. J. GARDNER   3,186,404
PRESSURE DEVICE AND SYSTEM FOR TREATING BODY MEMBERS
Filed June 21, 1961   2 Sheets-Sheet 1
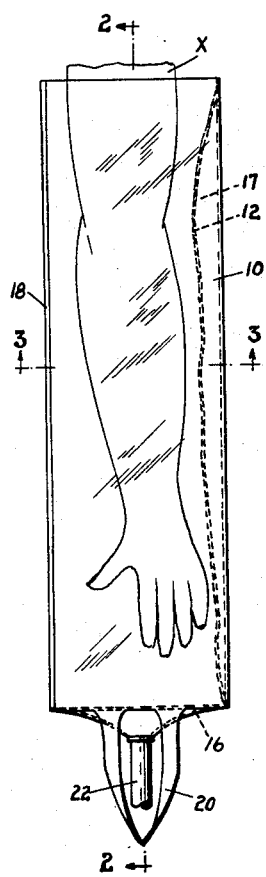
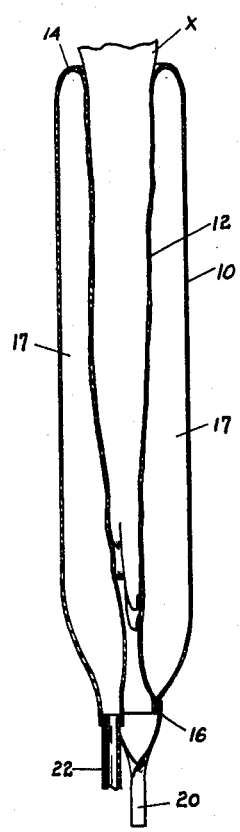
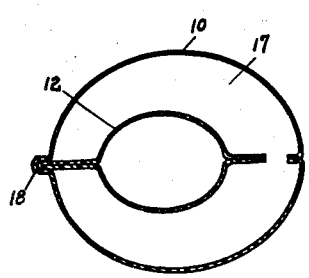
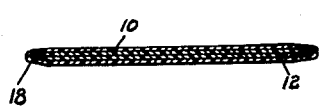
*INVENTOR.*
WILLIAM J. GARDNER
BY
Teare, Fetzer & Teare
ATTORNEYS June 1, 1965          W. J. GARDNER          3,186,404
PRESSURE DEVICE AND SYSTEM FOR TREATING BODY MEMBERS
Filed June 21, 1961          2 Sheets-Sheet 2
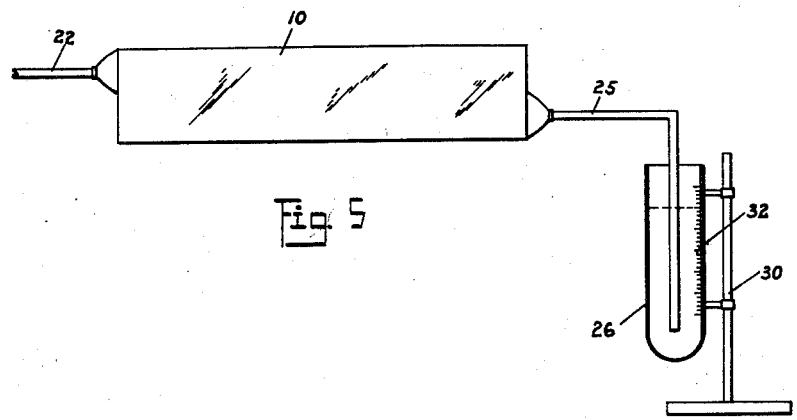
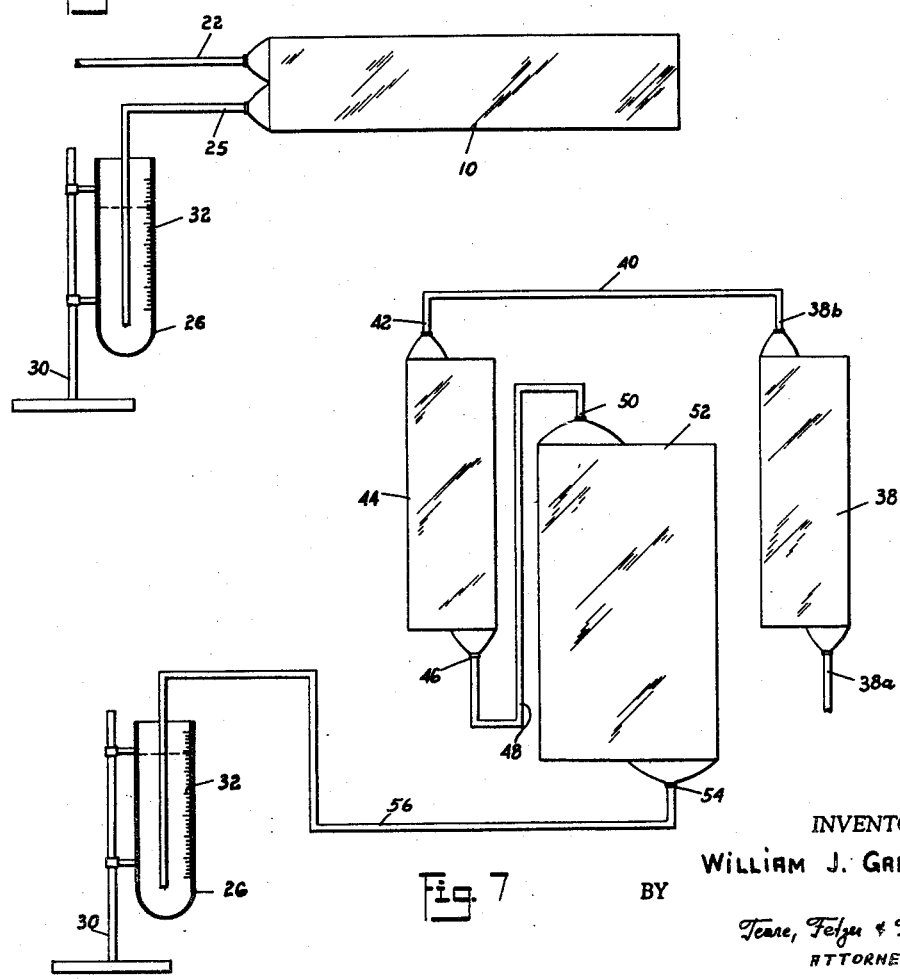

United States Patent Office 3,186,404
Patented June 1, 1965

3,186,404
PRESSURE DEVICE AND SYSTEM FOR
TREATING BODY MEMBERS
William J. Gardner, 2569 Berkshire Road,
Cleveland Heights, Ohio
Filed June 21, 1961, Ser. No. 118,681
8 Claims. (Cl. 128—87)

This invention relates in general to a pressure device or pressure bandage, and more particularly to an inflatable sleeve-like device which may be placed around an extremity of an animal body, such as an arm or leg, and which when inflated, will be operative to exert pressure against the entire area of the part of the body which is inserted therein.

Examples of the use of the device, are that it may be utilized as a readily applied splint, to hold immobile a fracture of an arm or leg, and/or it may be used to aid in stopping bleeding of the animal part inserted therein.

Accordingly, an object of the invention is to provide a novel pressure device for the insertion of a part of an animal body therein, for selectively applying pressure to said part.

Another object of the invention is to provide a device of the above type which is transparent, so that the animal part inserted therein may be viewed through the device.

Another object of the invention is to provide a device of the above type which is economical to manufacture, which is long wearing in use, and which may be readily transported or carried with minimum space requirements.

A further object of the invention is to provide a pressure device or pressure bandage which may be readily inflated, as by means of the mouth, and which is operative to apply pressure against the entire area of the animal part inserted therein for use, as for instance, in immobilizing the part and/or for controlling bleeding thereof.

Another object of the invention is to provide a system of treating an animal part inserted into the pressure device of the invention.

Other objects and advantages of the invention will be apparent from the following description taken in conjunction with the accompanying drawings, wherein:

FIG. 1 is a side elevational view of the pressure device of the invention in inflated condition and with an arm of an individual inserted therein;

FIG. 2 is a vertical sectional view taken generally along the plane of line 2—2 of FIG. 1, looking in the direction of the arrows;

FIG. 3 is a horizontal sectional view taken generally along the plane of line 3—3 of FIG. 1, looking in the direction of the arrows, and with the arm having been removed;

FIG. 4 is a transverse sectional, more or less diagrammatic view of the device in its collapsed condition;

FIG. 5 is a generally diagrammatic side elevational view of a modified form of the pressure device and more particularly a device having an outlet and a fluid pressure escape valve associated with the outlet;

FIG. 6 is a generally diagrammatic side elevational view of a further embodiment of the pressure device of the invention;

FIG. 7 is a generally diagrammatic elevational view of a plurality of the pressure devices of the invention interconnected in an organized system for application of predetermined pressure to a plurality of animal parts, such as for instance both arms and the torso of a human, or any of the other parts thereof.

Referring now again to the drawings, the pressure device or bandage of the invention comprises an outer envelope 10 and an inner envelope 12 defining an open ended sleeve-like article into which is adapted to be received an animal extremity, such as an arm or leg X, and to be preferably completely encompassed by the sleeve. The envelopes 10 and 12 are sealed at their upper and lower ends, as at 14 and 16 to form a collapsible chamber 17 for receiving therein fluid, and more particularly pressurized air. The envelopes 10 and 12 are preferably secured together along at least one side thereof and as at 18. Such securing may be continuous for the full height of the envelope or could be a staggered securement. In any event, this connecting of the envelopes along their corresponding vertical edges prevents the outer envelope from tending to peel or move off of the extremity upon inflation of the bandage. There is also preferably provided strap means 20 attached to one end of the bandage, so as to enable traction to be applied to the bandage when the latter is in inflated position upon the animal extremity.

There is provided a fluid pressure transmitting tube 22 which communicates with the space or chamber 17 between the inner and outer envelopes, for inflating the device, and thereby applying pressure to the inner envelope 12 and thus to the part inserted therein. Tube 22 may be formed of any suitable material, such as rubber, plastic or the like. Such pressure may be accomplished by any suitable means, such as by means of oral pressure from an individual's mouth, or by the use of mechanical pressure producing means, utilizing, for instance, a small hand bulb pump. When fluid pressure is inserted through tube 22, the pressure of the fluid in the space 17 inflates the outer envelope 10 and compresses the inner envelope 12 tightly against the entire area of the animal part inserted in the device. Once the device is inflated to the desired pressure, the tube can be crimped and held in such condition, as by means of a clip, or some other means may be utilized to hold the tube closed, such as for instance, a valve or the like on a band bulb pump, if the latter is utilized to produce pressure. Thus it will be seen that the device is readily and easily useable as a splint, for immobilizing an extremity which has been fractured, and/or the device may be used to apply pressure to the extremity to control bleeding thereof.

As aforementioned, the device, in accordance with the invention, is preferably comprised of transparent material, so that the part inserted therein may be viewed through the device. The materials from which the unit may be made can vary considerably, but for example, polyvinyl, polyethylene or polypropylene plastic film or sheet can be used, or any other flexible and transparent material which is impervious to the transmission of air therethrough. Polyethylene plastic has somewhat of a tendency to leak air and therefore is not preferred. The transparency of the material represents an important factor in treating various types of injuries which treatment is greatly aided by the ability to perform visual observation of the healing process.

As can be seen from FIG. 4, the device in its collapsed condition, represents a substantially flat article and due to the flexibility of the material from which it is formed, it may be folded into a relatively small package for transporting or shipping purposes.

It will be also seen that the device can be easily produced, and easily sealed at its necessary connections (e.g. 14, 16, 18) and by the application of conventional sealing procedures for sheet plastics, and as for example by the application of heat and pressure.

The device may be applied right over the clothing of an individual's extremity, and operates just as satisfactorily to apply pressure throughout the area of the extremity inserted therein. This gives tremendous useability to the device, as for instance it may be readily carried by combat military personnel for immediate application to an injured serviceman, and due to its compactness and ease of inflation provides tremendous advantages.

While the inner and outer envelopes have been shown as being connected along only one vertical edge thereof, it will be understood that such envelopes could be connected along both vertical edges thereof, the resulting effect being substantially the same so long as the air pressure can occupy both sides of the device and be operative to apply pressure against the total area of the animal part inserted into the device.

Referring now to FIG. 5, there is illustrated another embodiment of the pressure bandage. In this arrangement, the pressure device per se is generally similar to the first described embodiment and includes inner and outer envelopes defining a pressure receiving space therebetween. However, there is also provided an outlet 25, communicating with the pressure receiving space 17, and with the outlet being in the form of a tube which terminates in a bag or receptacle 26. The receptacle may be flexible, such as for instance a plastic bag, or may be rigid, such as for instance a glass receptacle, and is preferably transparent for ready viewing therethrough. The receptacle is filled to a predetermined point with a liquid, such as water, and may be supported on the stand 30. This arrangement provides an escape valve, for the air pressure in the pressure device to be maintained at the desired pressure, and if the pressure exceeds a predetermined desired value, the air will bubble through the liquid to escape. The receptacle is preferably graduated as at 32 for readily determining and fixing the escape pressure. It will be seen that with such an arrangement, pressurized air may be continuously fed into inlet 22, as for instance by means of a motor driven pump, and the escape valve mechanism provides for maintaining the pressure in the pressure sleeve at the predetermined value. It will also be seen that such an arrangement can provide for a continuous, or an intermittent, flow of pressurized air through the pressure device for cooling, or for heating, the animal part inserted therein, and at a selected pressure. This is a tremendous advantage in the treatment of burns, fever and the like. It will also be seen that with a substantially continuous supply of pressurized air through inlet 22, the material from which the envelopes 10 and 12 are formed would not have to be made of a material completely impervious to air, but that some passage of air through at least the inner envelope 12 might be advantageous to treatment of the injury of the animal part inserted therein.

FIG. 6 discloses another embodiment wherein the outlet 25 is disposed on the same end of the pressure bandage as the inlet 22, and with the animal part being preferably inserted into the bandage from the other end thereof, to increase the convenience of use of the device.

FIG. 7 shows a further embodiment wherein a plurality of the pressure devices are utilized in a connected system for simultaneous treatment of a plurality of animal parts, at a predetermined pressure. The lead one, 38, of the pressure bandages is provided with an inlet 38a, with the outlet 38b of device 38 being connected by tube 40 to the inlet 42 of another pressure device 44. The outlet 46 of device 44 may be connected by tube 48 to the inlet 50 of another pressure bandage 52, with the outlet 54 of the latter terminal bandage being connected by tube 56 to the liquid pressure escape valve mechanism. The latter system could be used, for instance, to encase the arms and torso of a human therein, and to apply a predetermined pressure to such animal parts, with a continuous flowing current of pressurized air, which could be either heated or cooled, depending on the result desired. It will be understood of course that sufficient interconnected pressure devices could be provided to encase all or any other selected parts of the human body.

From the foregoing discussion and accompanying drawings, it will be seen that the invention provides a novel pressure device or bandage for application to an animal part, and which may be readily inflated so that the part inserted in the device is exposed to pressure throughout the entire area of the part, and wherein the part may thus be partially immobilized for transportation. It will also be seen that the invention provides for the ready maintenance of a predetermined pressure in the device, and a method of maintaining such predetermined pressure, with the use of a continuously or an intermittently flowing current of pressurized air, which may be temperature regulated, either heated or cooled, for the expeditious treatment of the animal part inserted in the pressure device.

The terms and expressions which have been used are used as terms of description and not of limitation, and there is no intention in the use of such terms and expressions of excluding any equivalents of any of the features shown or described, or portions thereof, but it is recognized that various modifications are possible within the scope of the invention claimed.

I claim:

1. A pressure device formed of plastic material and adapted to receive an animal extremity therein, said device comprising a flexible generally non-elastic inner envelope of single wall thickness and a flexible generally non-elastic outer envelope of single wall thickness defining an elongated article which is open at both ends thereof for receiving said animal extremity therethrough, said envelopes being transparent and being sealed together at their ends to provide a single air pressure receiving space therebetween, generally linearly extending means sealing the envelopes together along one whole side thereof to provide a unitary tunnel-like structure for applying a uniform pressure to such extremity throughout the entire area of the extremity received therein, and means for inflating the space between said envelopes, whereby said inner envelope will be compressed tightly against the animal extremity and said outer envelope will become a generally rigid article.

2. A device in accordance with claim 1, wherein said envelopes are comprised of a thin polyvinyl sheet, and wherein said device is of a sufficient length to completely encompass the animal extremity.

3. A pressure device adapted for receiving therein an animal part comprising a flexible, non-elastic inner envelope and a flexible, non-elastic outer envelope defining a sleeve-like article which is open at both ends thereof for receiving said animal part therethrough, means sealing the envelopes together at the ends thereof to provide a single pressure receiving space therebetween, said envelopes having inlet and outlet means for introducing and exhausting fluid pressure from said space, fluid pressure actuated relief valve means operably associated with said outlet means for continually regulating the rate of exhaustion of pressurized fluid from the space between said envelopes to maintain a predetermined continuous flow of pressurized fluid through said device, said relief valve means including a tube coupled to said outlet means, and a transparent receptacle adapted to receive a predetermined height of water therein disposed adjacent said tube which tube extends downwardly and terminates adjacent the bottom of said receptacle.

4. A pressure device in accordance with claim 3, wherein said inlet means is located on one end of said device and said outlet means is located on the other end of said device.

5. A pressure device in accordance with claim 3, wherein said inlet and outlet means are located on the same end of said device.

6. In a system for treating a plurality of animal parts, comprising a plurality of pressure devices adapted to receive therein a respective animal part and apply pressure thereto, each of said devices being spaced apart for independent application to selective of said animal parts, means coupling said devices together in series for consecutive transmission of fluid pressure therebetween, each of said devices comprising a flexible, generally non-elastic inner envelope and a flexible, generally non-elastic outer envelope defining an elongated article which is open at both ends thereof, means sealing the envelopes of each of the respective devices together at the ends thereof to provide a single pressure receiving space therebetween, linearly extending means sealing the envelopes of each of the respective devices together along one side thereof to provide a unitary, tunnel-like structure for applying a uniform pressure throughout the entire area of the respective animal part received therein, and a source of fluid pressure for continually introducing pressurized fluid into space between the envelopes of the lead one of said devices.

7. In a system for treating a plurality of animal parts comprising a plurality of pressure devices adapted to receive therein a respective animal part and apply pressure thereto, each of said devices being spaced apart for independent application to selective of said animal parts, means coupling said devices together in series for consecutive transmission of fluid pressure therebetween, each of said devices comprising a flexible generally non-elastic inner envelope and a flexible generally non-elastic outer envelope defining an elongated article which is open at both ends thereof, means sealing the envelopes of each of the respective devices together at the ends thereof to provide a single pressure receiving space therebetween, linearly extending means sealing the envelopes of each of the respective devices together along one side thereof to provide a unitary tunnel-like structure for applying a uniform pressure throughout the entire area of the respective animal part received therein, means for continually introducing pressurized fluid into the space between the envelopes of the lead one of said devices, and relief valve means coupled to the terminal one of said pressure devices for continually regulating the rate of exhaustion of fluid pressure from the space between the envelopes in all of the respective of said devices to maintain a predetermined continuous flow of pressurized fluid through all of said devices, said relief valve means including a tube coupled to the terminal one of said pressure devices and a transparent receptacle adapted to receive a predetermined height of water therein, disposed adjacent said terminal one of said devices, said tube extending downwardly and terminating adjacent the bottom of said receptacle.

8. A pressure device formed of foldable plastic material and adapted to receive an arm or leg animal extremity therein, said device comprising a flexible generally non-elastic polymeric plastic inner envelope of single wall thickness and a flexible, complementary, generally non-elastic polymeric plastic outer envelope of single wall thickness, defining an elongated rectangular shaped article in the latter's deflated condition, which is open at both ends thereof for receiving said animal extremity therethrough, and is of sufficient length for encompassing substantially the full extent of the extremity from the latter's juncture with the animal body, said envelopes being transparent and being sealed together at their ends to provide a single air pressure receiving space therebetween, generally linearly extending means sealing the envelopes together along one whole side thereof, to provide a unitary tunnel-like structure for applying a uniform pressure to such extremity throughout the entire area of the extremity received therein, and means for inflating the space between said envelopes whereby said inner envelope will be compressed tightly against the animal extremity and said outer envelope will become a generally rigid article, the last mentioned means comprising a tubular-like member communicating with said space and extending from said outer envelope so as to emit air into said space in the direction of elongation of said article and the direction of extension of said linearly extending means.

References Cited by the Examiner

UNITED STATES PATENTS

| | | | |
|---|---|---|---|
| 1,795,893 | 3/31 | Rosett | 128—38 |
| 1,967,923 | 7/34 | Connolly | 128—155 X |
| 2,145,932 | 2/39 | Israel | 128—38 |
| 2,267,070 | 12/41 | Baldwin | 128—165 |
| 2,699,165 | 1/55 | Ferrier | 128—60 |
| 2,832,336 | 4/58 | Davis | 128—38 |
| 2,834,340 | 5/58 | Walter | 128—84 |

FOREIGN PATENTS

| | | |
|---|---|---|
| 440,113 | 1/27 | Germany. |
| 549,294 | 11/42 | Great Britain. |

RICHARD A. GAUDET, *Primary Examiner.*

RICHARD J. HOFFMAN, JORDAN FRANKLIN,
*Examiners.*